No. 762,087. PATENTED JUNE 7, 1904.
E. ROBION.
CHANGEABLE SPEED GEARING.
APPLICATION FILED SEPT. 15, 1902.
NO MODEL.
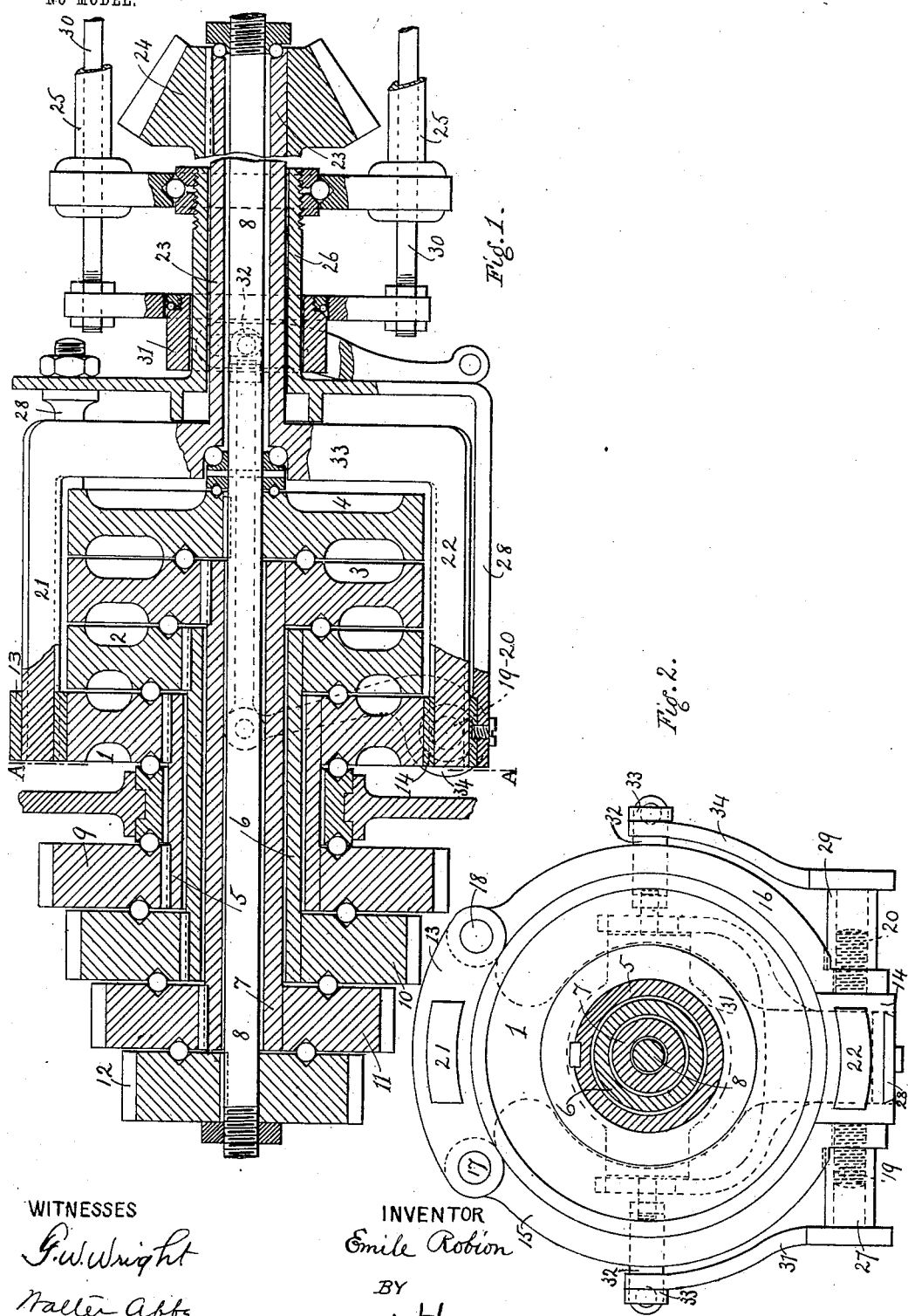

No. 762,087.

Patented June 7, 1904.

UNITED STATES PATENT OFFICE.

EMILE ROBION, OF PUTEAUX, FRANCE.

CHANGEABLE-SPEED GEARING.

SPECIFICATION forming part of Letters Patent No. 762,087, dated June 7, 1904.

Application filed September 15, 1902. Serial No. 123,483. (No model.)

*To all whom it may concern:*

Be it known that I, EMILE ROBION, a citizen of the Republic of France, and a resident of Puteaux, in the Republic of France, have invented certain new and useful Improvements in Changeable-Speed Gearing, of which the following is a specification.

This invention has for its object an improved change-speed gear specially applicable to high-speed motors, and more particularly to autocars or automobiles.

This improved system of gearing based on the use of friction has not the drawbacks of the various arrangements hitherto employed—for instance, those operated by belt-gear or movable pinions.

The arrangement which forms the object of the present invention is characterized by the use of a skate or collar movable in a lateral direction and adapted to be displaced as regards friction-wheels of the same diameter with which it may be coupled by a progressive grip, said wheels having their journals or bearing-sleeves superposed in such a way as to be capable of being placed side by side while being maintained on the same shaft in a number which is variable at will. On each of the journals or bearing-sleeves a pinion or other transmission device is fixed, the different diameters of these pinions corresponding to the different speeds.

In the following specification reference will be made to the accompanying drawings, in which—

Figure 1 is a longitudinal section given as an example of a gearing for changing speed; Fig. 2, a transverse section on the line A A of Fig. 1.

The apparatus comprises a certain number of friction-wheels 1 2 3 4—for instance, four—each mounted on a hollow bearing or sleeve 5 6 7 8. These sleeves are arranged one around another, and each carries at its end opposite the wheel a toothed pinion 9 10 11 12 or other like organ of transmission. On the external periphery of one of the friction-wheels a single skate or collar is applied, formed, for instance, of four articulated parts, two of which, 13 14, are mounted on guiding and driving pieces 21 and 22 and the other two are curved links 15 and 16, pivoted at 17 and 18 on the part 13 and fixed to the part 14 by right and left handed screws 19 and 20.

The operating-guides 21 and 22 are firmly mounted on a sleeve or socket 23, on which is keyed a pinion 24, driven by the motor. The skate or collar may be displaced laterally and brought onto any one of the friction-wheels when it is desired to change the speed by sliding the hollow rods 25 in the desired direction, so as to cause the socket 26 to slide and to carry with it the collar by means of cross-bars 28.

The collar is gripped upon the required wheel by pushing the rods 30, located in the interior of the tubes 25, which produces an angular displacement of nuts 27 and 29, mounted on the screws 19 and 20, and by means of the socket 31, connecting-pieces 32, rods 33, and cranks 34. The reverse movement communicated by the rods 30 produces the release of the collar.

The working of the arrangement will be easily understood. The pinion 24 in its movement carries with it the socket 23 and the guides 21 22, which actuate the skate or collar 13 20, and as this latter may be applied to any one of the wheels 1 2 3 4 a simple and efficacious means is thus provided of varying the speed.

My improved system of throwing into action gearing in order to change the speed may be employed generally and used with the motors of autocars, ships, and the like operated by steam, and with petroleum, gas, electricity, and like motors.

The arrangement, construction, and mounting of the various parts may be varied according to the use for which the apparatus is required without departing from the scope of the invention.

I claim as my invention—

1. Gearing, comprising a number of friction-wheels, sleeves and driving-pinions, a single collar of articulated parts adapted to surround the periphery of one of the wheels and a driving-pinion to drive said collar, in combination with means for moving said collar to a position surrounding any one of said wheels, and means when in such position for contracting said collar to cause it to grip one of such wheels, substantially as described.

2. Gearing, comprising a number of friction-wheels, a sleeve for each wheel and a driving-pinion for each sleeve, in combination with a collar of articulated parts, a guide therefor, a shaft for said collar and a pinion to drive it, a sleeve within which the shaft rotates adapted to move the collar into position over any one of said friction-wheels, and means for contracting the articulated parts, substantially as described.

3. Gearing, comprising a number of friction-wheels, a sleeve for each wheel and a driving-pinion for each sleeve, in combination with an articulated collar, comprising parts 13, 14, and curved links connecting them, a guide for the collar, a shaft for said collar and a pinion to drive it, a sleeve within which the shaft rotates and means for moving said sleeve and collar into position over any one of said friction-wheels, and a sleeve concentric with the first adapted to be moved longitudinally independently to cause said collar to grip said wheel, substantially as described.

4. A number of friction-wheels side by side and pinions connected therewith, a collar adapted to surround one of said wheels, a screw uniting the ends of the collar, and a guide for the collar in combination with a shaft and pinion for rotating said guide, a sleeve concentric with said shaft and movable transversely thereon, connections between said sleeve and collar so that they will move together, a sleeve concentric with the first sleeve and movable longitudinally thereon and links and cranks connecting said sleeve with the screw, substantially as described.

In testimony whereof I have signed my name to this specification in the presence of two subscribing witnesses.

EMILE ROBION.

Witnesses:
ALPHONSE MÉJEAN,
EDWARD P. MACLEAN.